United States Patent Office 3,785,936
Patented Jan. 15, 1974

3,785,936
ANODIZED ALUMINUM TEST PANEL FOR EVALUATING INSPECTION PENETRANT PERFORMANCE
James R. Alburger, 5007 Hillard Ave., La Canada, Calif. 91011
No Drawing. Filed Mar. 24, 1972, Ser. No. 237,984
Int. Cl. C23b 9/02; C23f 17/00
U.S. Cl. 204—38 A                            3 Claims

ABSTRACT OF THE DISCLOSURE

A test panel which may be used for evaluating inspection penetrant crack detection performance, the preferred structure of said panel being a sheet of aluminum anodized in a sulfuric acid bath to a controlled anodic film thickness between about 5 microns and 50 microns, heat sealed and coated with a thin glassy layer of sodium silicate, baked to cure the silicate layer, and stress cracked to provide cracks extending through the thickness of the anodic coating.

RELATED PATENTS

U.S. Pat. No. 3,164,006, "Evaluation Performance of Liquid Penetrant Tracer Materials."

There has been a continuing need for an improved test panel which may be used for evaluating the crack detection performance capability of inspection penetrants. In my U.S. Pat. No. 3,164,006, I have disclosed and claimed an anodic-film test panel which contains cracks and surface porosities. When a dye penetrant, such as a fluorescent or visible dye inspection penetrant is applied to this type of test surface, entrapments of the dyed penetrant liquid are retained in any cracks or porosities which are present in the anodic layer. Upon completion of the penetrant process, i.e., application of penetrant, removal of surface penetrant, and drying of the test surface, the entrapments of penetrant may be seen by visual inspection under black light or white light, as may be applicable.

In certain important procedures for the determination of the degree of defect indication retention, stability of indications, and effective brightness of fluorescent indications, it has been found that the surface porosity conditions which naturally occur in an anodic coating tend to interfere with the accurate evaluation of penetrant entrapments which are present in stress cracks in the anodic layer.

It has become necessary to seek ways in which the porosity condition of the anodic film may be eliminated, or at least reduced to a point where indications of such porosities fall substantially below a threshold where interference does not occur.

The principal object of the invention, therefore, is to provide an improved stress-cracked anodic test surface in which surface porosities are sealed and effectively eliminated.

Other and incidental objects of the invention will in part be obvious and will in part become apparent from the following description thereof.

I have discovered that it is possible to apply an extremely thin coating of inert sealant material onto the normally porous anodized surface of a metal panel in such a way that the test surface has a glassy, smooth, and nonabsorbing character. When a highly sensitive fluorescent inspection penetrant is applied to a thus-prepared and uncracked test surfact, the inspection penetrant does not penetrate into or stain the test surface.

While the test panel structure of the invention may be prepared by anodizing any one of several metal materials which are capable of yielding anodic coatings by electrolytic action, the preferred metal is aluminum, for the reason that by use of appropriate anodizing procedures, e.g., anodizing a sulfuric acid bath, the resulting anodic coating on aluminum has a colorless and transparent character which permits visual or photoelectric observation of colored or fluorescent entrapments which may be retained in stress cracks in the transparent surface layer.

As pointed out above, anodic coatings normally contain microscopic surface porosities which act to retain significant amounts of dyed penetrant, and in the case of highly sensitive fluorescent penetrants, the presence of such background porosity indications tends to interfere with an accurate evaluation of actual crack entrapments.

I have attempted to seal or otherwise cover up the minute surface porosities in an anodic coating by applying a thin coating of resin material, such as epoxy, polyester, or phenolic materials. Such coatings have not been successful for two reasons. Firstly, all organic resins have a tendency to absorb dyes to a greater or lesser degree, with the result that the resin film may become stained by contact with a fluorescent or visible dye penetrant liquid. Thus, even though the coating of resin material seals or covers up porosities in the anodic coating, the resin coating itself tends to generate a severe background of indications, particularly in the case of contact with highly sensitive fluorescent inspection penetrants. Secondly, organic resins, even thermosetting types, are sensitive to a degree to strong solvents such as methylene chloride, which solvents may be used to clean the test surface after use and in preparation for the next usage. Repeated applications of such strong solvents tend to dissolve or destroy the resin coating.

I have discovered that it is possible to seal and cover up porosities in an anodic coating in such a way that the sealant layer is nonabsorbing, glassy smooth, and impervious to solvent action. The preparation and use of test panels of the invention are set forth in the following examples:

Example I

A sheet of 1100–0 aluminum alloy .050" thick was anodized on both sides in a sulfuric acid bath to an anodic film thickness of .001" (40 microns). This anodic treatment is known as type 215–R1 clear coating. Following the anodic treatment of the aluminum sheet, the sheet was immersed in hot water at a temperature of about 180° F., this treatment being normal practice for "heat-sealing" and hardening the anodic coating to a rugged and durable condition.

The thus-prepared anodized sheet was cut into 4" squares. The squares were then dipped in a solution of alkali silicate prepared as follows:

|  | Part |
|---|---|
| Sodium silicate solution (41° Bé.) | 1 |
| Water | 1 |

The small 4" square panels were dipped in the sodium silicate solution, and excess liquid was blown off the panel by means of a compressed air jet, or the panel was allowed to drain dry. When the panel was completely dry, it was warmed gently in an oven or hot air stream to a temperature of about 150° F., sufficient to completely set the coating of alkali silicate.

It was found that one treatment of coating with an alkali silicate was sufficient to completely seal the porosity condition in a 40-micron thick anodic coating. For thinner anodic films, such as 5 or 10 micron coatings, a lower concentration of alkali silicate could be used to provide a glassy nonporous coating. It was found that the thickness of the coating could be adjusted by varying the concentration of alkali silicate in the coating solution, or varying the thickness of the wet film of silicate solution on the anodic layer by the method of draining or stripping from the anodic surface.

The completed, coated, panel was tested as follows: A drop of high-sensitivity fluorescent penetrant was placed on the panel. The panel was then wiped clean by rubbing with soft paper towelling, and was finally polished with a soft paper tissue (Kleenex). The surface of the panel was examined under black light during the mechanical cleaning and polishing operation, and it was noted that virtually all of the penetrant was removed, leaving no residual porosity entrapments and practically no residual fluorescence.

The sealed and coated panel was then bent around a cylindrical form having a radius of curvature of about 3/4" to 4", thus producing a pattern of closely spaced cracks extending through the anodic coating down to the base metal. The bent panel was then flattened out, and a second bending operation was carried out at right angles to the first bend. In this manner, a mass of closely spaced craze-cracks or stress-cracks were produced. The bent panel was again flattened out, and was set aside for use in the evaluation of inspection penetrant performance.

An alternative procedure for producing a stress-crack pattern is to heat the panel rapidly on a hot plate, whereby the rapid expansion in the panel acts to produce craze cracks in the anodic film.

Example 2

A procedure for evaluating the performance of a series of fluorescent inspection penetrants was carried out as follows: Four fluorescent penetrants, designated by sensitivity levels 1, 3, 5, and 7, respectively, in which the dimensional thresholds of fluorescence (film thickness at half fluorescent brightness) are about 9, 4.5, 2.2, and 1.1 microns, respectively, were utilized sequentially, each being applied to the craze cracked panel of Example 1. For each test, the panel was cleaned and mechanically polished with soft paper tissue to remove all surface penetrant, leaving only entrapments of penetrant in actual cracks.

The thus-cleaned and polished panel was placed under an electron-multiplier photosensor, and was irradiated by means of a constant intensity black light. Readings of fluorescent brightness were taken, showing the relative brightness response characteristics of the four levels of fluorescent penetrant sensitivity.

Relative brightness values of 12.2, 25, 47, and 72 were obtained for the four penetrant samples. Comparison of these brightness values with the known fluorescence transition features of the penetrants, enabled the determination that the effective width of the 40-micron depth cracks was about two microns. Metallurgical section and microscopic analysis of the cracked panel confirmed this calculation.

Example 3

A side-by-side evaluation of a water-washable penetrant of unknown sensitivity was made with a series of known water-washable reference penetrants. Narrow streaks of penetrant were placed side-by-side on the crazed area of the test panel. The panel was then washed in water for one minute, and was quickly dried in a jet of compressed air. Examination under black light, and comparison of the unknown penetrant streak with the reference streaks (by matching brightness values), permitted immediate identification of the unknown material as to its level of dimensional sensitivity.

Example 4

Four fluorescent penetrant samples, all having the same dimensional transition of fluorescence (of 1.2 micron), but being characterized by different degrees of sensitizer stability were applied side-by-side on a test panel of Example 1 in which the craze cracks were 40 microns deep. The streaks of penetrant were carefully blotted up by use of paper towelling so as to avoid intermixing the streaks, and the panel surface was then polished clean with a soft paper tissue.

Following this mechanical polishing action, the panel was placed under a constant intensity black light, and each of the streak areas showing fluorescent craze cracks was measured as to its relative brightness, using an electron-multiplier photocell setup. All four samples were found to measure about 100 on a linear scale of brightness values.

The test panel was then immersed in water for exactly one minute, after which the panel surface was dried quickly under a jet of compressed air. Measurements were again made of relative brightness values under the same standardized black light intensity, yielding brightness readings of 25, 30, 50, and 65, respectively. It was concluded from these measurements that the effective efficiencies of indication retention under the specified conditions of wash-water contact time were 25%, 30%, 50%, and 65%, respectively.

In all of the foregoing examples, it was found that measurement results or results of visual comparison could be repeated accurately with a probable error of only a few percent.

I have found that the alkali silicate coating of the invention may take several forms. The alkali metal may be any one or a combination of sodium, lithium, or potassium. Slight differences in water-solubility of the oven-baked silicate coating are found with different alkali metals. Lithium provides the lowest degree of solubility of deposited films, but initial solutions of the lithium silicate are less stable than are solutions of sodium and potassium silicates. The preferred, and most readily available alkali silicate is sodium silicate, and this is commercially available as a 41° Bé. solution containing about 30% by weight of sodium silicate.

Various ratios of alkali metal to silicate may be employed, ranging from about 1.6 parts silicate to one part metal oxide, to 3.75 parts silicate to one part metal oxide (parts by weight). In the case of sodium silicate, the typical "water glass" product at 41° Bé. has a $SiO_2/Na_2O$ ratio of about 3.3. This may be identified by the chemical formula: $3.3SiO_2/Na_2O$. This type silicate, when dried and oven baked, has a very low solution rate in water. Thus, deposited films of the sodium silicate are quite durable and resistant to water and other solvents.

As pointed out above, various metals other than aluminum may be employed as the base metal for forming a brittle anodic film. Among the various metals which will function in this respect are: beryllium, magnesium, thorium, titanium, uranium, and zirconium. Aluminum, however, is the preferred material, although the other anodic-film-forming metals are considered to be equivalent materials in all essential respects pertaining to anodic film formation.

The thickness of the anodic coating may be varied over the range of from about 5 microns up to 50 microns. Fifty microns is about the limit attainable in anodizing aluminum, since the rate of deposit of the anodic film slows down excessively at this point. When the thickness of the anodic coating is made less than about 5 microns, it becomes quite difficult to produce stress cracking in the anodic layer. I have found it possible to accurately produce anodic coatings having thickness values of 10, 20, and 40 microns, respectively, and these thickness values provide crack conditions suitable for measurement and standardization of inspection penetrant materials and processes for a wide range of military and industrial usages.

Standard anodizing procedures, identified as follows, will yield the indicated anodic film thicknesses.

| Procedure: | Anodic film thickness, microns |
|---|---|
| 215–R1 | 40 |
| 204 Clear | 20 |
| Commercial Clear | 10 |

The actual thickness of the anodic layer may be accurately measured by means of known beta-ray back-scatter techniques and instruments.

Various anodic treatments may produce distinctly different characteristics in the resulting anodic coatings. In the case of aluminum, for example, the use of a chromic acid bath or the use of an oxalic acid bath, both of which are common in commercial usage, may form films which are tough, elastic, and difficult to crack by bending or heating. Some anodic coatings develop a brownish color which tends to interfere with the transmission of ultraviolet and visible radiation. All things considered, aluminum is the preferred base metal, and the commercially available sulfuric acid anodizing process yields the best results, best transparency of the anodic coating, and the most satisfactory condition of brittleness.

The glassy layer of alkali silicate should be kept as thin as possible so as to avoid any significant alteration or increase in the effective thickness of the brittle anodic coating. At the same time, its thickness must be great enough to completely seal and cover up surface porosities in the anodic coating.

While it is difficult to accurately measure the thickness of the coating of alkali silicate which is applied by using the described technique, this thickness may be estimated by noting that the approximate thickness of the wet coating of diluted alkali silicate solution may be made about .0001" (4 microns). Under this condition, where a 6% solution of alkali silicate is employed, the resulting layer of dried alkali silicate is somewhat less than one micron. When two coats are applied, the thickness of the layer of silicate is only slightly greater than one micron. It appears that the addition of a coating of alkali silicate sufficient to completely seal porosities in the anodic layer will not alter the thickness of the brittle coating by more than two or three percent. A practical range of thickness values for the coating of silicate is from about .1 micron to about 5 microns.

It can be seen from the foregoing description that I have discovered a new and useful improvement in the structure of a cracked anodic test panel for use in evaluating flaw entrapment features of inspection penetrants. Although the invention has been described with reference to particular embodiments thereof, it will be understood that various changes and modifications may be made therein, without departing from the spirit of the invention nor the scope of the appended claims.

I claim:

1. A test panel for evaluating inspection penetrant performance consisting of an aluminum sheet anodized with a transparent anodic coating formed in sulfuric acid to a controlled anodic film thickness within the range of from about 5 microns to 50 microns, said anodic film being heat-sealed then coated with a glassy layer of alkali silicate, and stress cracked to provide a crack pattern in which the cracks extend through the thickness of said sealed and coated anodic film.

2. A test panel in accordance with claim 1 in which said alkali silicate is at least one member selected from the group consisting of sodium silicate, lithium silicate and potassium silicate.

3. A test panel in accordance with claim 1 in which said anodizable metal is aluminum, and said alkali silicate is sodium silicate having the approximate empirical formulation of $3.3SiO_2/Na_2O$.

References Cited
UNITED STATES PATENTS

| | | | |
|---|---|---|---|
| 3,335,074 | 8/1967 | Wright et al. | 204—56 R |
| 2,928,776 | 3/1960 | Puppolo | 204—28 |
| 1,946,153 | 2/1934 | Edwards | 204—35 N |
| 3,174,916 | 3/1965 | Cohn | 204—35 N |

JOHN H. MACK, Primary Examiner

R. L. ANDREWS, Assistant Examiner